(12) United States Patent
Cui et al.

(10) Patent No.: US 11,742,518 B2
(45) Date of Patent: Aug. 29, 2023

(54) ELECTROLYTE, AND ELECTROCHEMICAL DEVICE AND ELECTRONIC DEVICE USING THE SAME

(71) Applicant: NINGDE AMPEREX TECHNOLOGY LIMITED, Ningde (CN)

(72) Inventors: Hui Cui, Ningde (CN); Shuirong Zhang, Ningde (CN); Chao Tang, Ningde (CN); Jianming Zheng, Ningde (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 265 days.

(21) Appl. No.: 16/770,783

(22) PCT Filed: Dec. 24, 2019

(86) PCT No.: PCT/CN2019/127966
§ 371 (c)(1),
(2) Date: Jun. 8, 2020

(87) PCT Pub. No.: WO2021/127993
PCT Pub. Date: Jul. 1, 2021

(65) Prior Publication Data
US 2021/0408600 A1 Dec. 30, 2021

(51) Int. Cl.
*H01M 10/0567* (2010.01)
*H01M 50/417* (2021.01)
(Continued)

(52) U.S. Cl.
CPC ....... *H01M 10/0567* (2013.01); *H01M 4/131* (2013.01); *H01M 4/587* (2013.01);
(Continued)

(58) Field of Classification Search
None
See application file for complete search history.

(56) References Cited

U.S. PATENT DOCUMENTS

2013/0316252 A1* 11/2013 Lee .................. H01M 10/0567
429/188
2016/0301103 A1* 10/2016 Kim .................. H01M 10/0567
(Continued)

FOREIGN PATENT DOCUMENTS

| CN | 102195083 A | 9/2011 |
|---|---|---|
| CN | 102832408 A | 12/2012 |

(Continued)

OTHER PUBLICATIONS

Sabrina Paillet et al., "Determination of the electrochemical performance and stability of the lithium-salt, lithium 4,5-dicyano-2-(trifluoromethyl) imidazolide, with various anodes in Li-ion cells", Journal of Power Sources, vol. 299, 2015, pp. 309-314.*

(Continued)

*Primary Examiner* — Laura Weiner
(74) *Attorney, Agent, or Firm* — Juan Carlos A Marquez; Marquez IP Law Office, PLLC

(57) ABSTRACT

An electrolyte includes at least one of a compound of Formula I, a compound of Formula II or a compound of Formula III; and a compound of Formula IV; where, $R_{11}$, $R_{12}$, $R_{13}$, $R_{21}$, $R_{22}$, $R_{31}$, $R_{32}$, $R_{33}$ and $R_{34}$ are independently selected from H, halo, cyano, substituted or unsubstituted $C_1$-$C_{10}$ alkyl, substituted or unsubstituted $C_2$-$C_{10}$ alkenyl, and substituted or unsubstituted $C_6$-$C_{12}$ aryl; $R_{41}$ and $R_{44}$ are independently selected from H, F, cyano, substituted or unsubstituted $C_1$-$C_{10}$ alkyl, substituted or unsubstituted $C_2$-$C_{10}$ alkenyl, substituted or unsubstituted $C_6$-$C_{12}$ aryl, $R^a$—(O—$R^b$), or (O—$R^b$); and $R_{42}$ and $R_{43}$ are independently selected from $R^c$—(O—$R^d$) or (O—$R^d$). $R^b$ is selected from substituted or unsubstituted $C_1$-$C_4$ alkyl; $R^a$, $R^c$ and $R^d$ are independently selected from substituted or unsubstituted $C_1$-$C_4$ alkylene, $C_2$-$C_5$ alkenylene, or $C_6$-$C_{12}$ aryl.

7 Claims, No Drawings

(51) Int. Cl.

| | |
|---|---|
| *H01M 50/491* | (2021.01) |
| *H01M 4/131* | (2010.01) |
| *H01M 4/66* | (2006.01) |
| *H01M 10/0525* | (2010.01) |
| *H01M 10/0568* | (2010.01) |
| *H01M 10/0569* | (2010.01) |
| *H01M 4/587* | (2010.01) |

(52) U.S. Cl.
CPC ....... *H01M 4/662* (2013.01); *H01M 10/0525* (2013.01); *H01M 10/0568* (2013.01); *H01M 10/0569* (2013.01); *H01M 50/417* (2021.01); *H01M 50/491* (2021.01); *H01M 2300/0028* (2013.01)

(56) References Cited

U.S. PATENT DOCUMENTS

| | | | |
|---|---|---|---|
| 2018/0233778 A1* | 8/2018 | Park | H01M 10/0567 |
| 2020/0099103 A1 | 3/2020 | Wang | |
| 2021/0218060 A1* | 7/2021 | Paillet | H01M 10/0569 |

FOREIGN PATENT DOCUMENTS

| | | |
|---|---|---|
| CN | 105074993 A | 11/2015 |
| CN | 105355968 A | 2/2016 |
| CN | 107482253 A | 12/2017 |
| CN | 108232296 A | 6/2018 |
| CN | 108242556 A | 7/2018 |
| CN | 109301322 A | 2/2019 |
| CN | 109841831 A | 6/2019 |
| CN | 109980225 A | 7/2019 |
| CN | 110165219 A | 8/2019 |
| JP | 2001143746 A | 5/2001 |
| JP | 2002231306 A | 8/2002 |
| JP | 2010062132 A | 3/2010 |
| JP | 2016526772 A | 9/2016 |
| JP | 6245312 B2 | 12/2017 |
| KR | 20180050780 A | 5/2018 |
| WO | WO 2018/163127 * | 9/2018 |

OTHER PUBLICATIONS

Fredrik Lindgren et al. SEI Formation and Interfacial Stability of a Si Electrode in a LITDI-Salt Based Electrolyte with FEC and VC Additives for Li-Ion Batteries, ACS Applied Materials & Interfaces 2016 8 (24), pp. 15758-15766.*

International Search Report dated Jul. 28, 2020 in counterpart PCT application PCT/CN2019/127966. 5 pages in Chinese.

Korean Office Action dated Dec. 9, 2021 in counterpart Korean application KR9-5-2021-096862662, 8 pages in Korean.

Japanese Office Action dated Apr. 5, 2022 in counterpart Japanese application JP2020-517451, 2 pages in Japanese.

Chinese Office Action dated Nov. 3, 2021 in counterpart Chinese application CN201980027752.8, 9 pages in Chinese.

India Office Action dated Aug. 26, 2022 in counterpart Indian application 202027023531, 6 pages in English.

Japanese Office Action dated Aug. 2, 2022 in counterpart Japanese application JP2020-517451, 3 pages in Japanese.

* cited by examiner

ELECTROLYTE, AND ELECTROCHEMICAL DEVICE AND ELECTRONIC DEVICE USING THE SAME

CROSS REFERENCE TO RELATED APPLICATIONS

The present application is a National Stage application of PCT international application PCT/CN2019/127966, filed on 24 Dec. 2019, the entire content of which is incorporated herein by reference.

BACKGROUND

1. Technical Field

The present application relates to the technical field of energy storage technologies, and more particularly to an electrolyte and an electrochemical device and electronic device using the electrolyte.

2. Description of the Related Art

Electrochemical devices (for example, lithium-ion batteries) are widely used in electric vehicles, wearable devices, smart phones, drones, notebook computers, and other areas due to their advantages of high working voltage, high energy density, environmental friendliness, stable cycle performance, and high safety. With the development of modern information technology and the widened use of lithium-ion batteries, higher requirements are expected for lithium-ion batteries, such as cycle performance and storage performance at high-temperature.

In view of this, there is a need to provide an improved electrolyte and an electrochemical device and electronic device using the electrolyte.

SUMMARY

The present application provides an electrolyte and an electrochemical device and electronic device using the electrolyte, to try to solve to some extent at least one of the problems existing in related art.

According to one aspect of the present application, the present application provides an electrolyte comprising at least one of a compound of Formula I, a compound of Formula II or a compound of Formula III; and a compound of Formula IV:

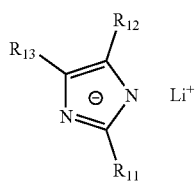

(Formula I)

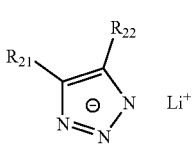

(Formula II)

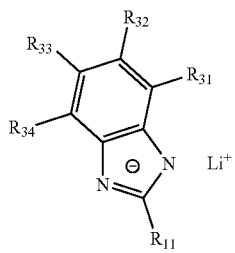

(Formula III)

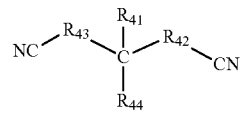

(Formula IV)

wherein:
$R_{11}$, $R_{12}$, $R_{13}$, $R_{21}$, $R_{22}$, $R_{31}$, $R_{32}$, $R_{33}$ and $R_{34}$ are each independently selected from H, halo, cyano, substituted or unsubstituted $C_1$-$C_{10}$ alkyl, substituted or unsubstituted $C_2$-$C_{10}$ alkenyl, and substituted or unsubstituted $C_6$-$C_{12}$ aryl;

$R_{41}$ and $R_{44}$ are each independently selected from H, F, cyano, substituted or unsubstituted $C_1$-$C_{10}$ alkyl, substituted or unsubstituted $C_2$-$C_{10}$ alkenyl, substituted or unsubstituted $C_6$-$C_{12}$ aryl, $R^a$—(O—$R^b$), or (O—$R^b$); and $R_{42}$ and $R_{43}$ are each independently selected from $R^c$—(O—$R^d$) or (O—$R^d$);

wherein $R^b$ is selected from substituted or unsubstituted $C_1$-$C_4$ alkyl;

$R^a$, $R^c$ and $R^d$ are each independently selected from substituted or unsubstituted $C_1$-$C_4$ alkylene, $C_2$-$C_5$ alkenylene, or $C_6$-$C_{12}$ aryl; and when substituted, the substituent is selected from halo, cyano or a combination thereof.

According to an embodiment of the present application, the compound of Formula I includes at least one of the following compounds:

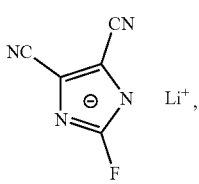

(Formula I-1)

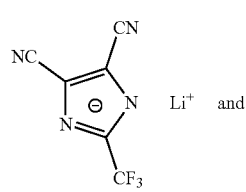

(Formula I-2)

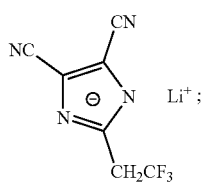

(Formula I-3)

the compound of Formula II
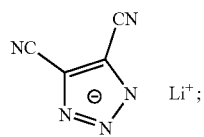
(Formula II-1);
(Formula II-1); and
the compound of Formula III is
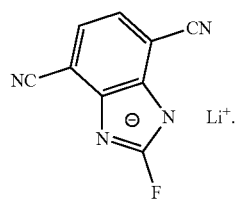
(Formula III-1).
According to an embodiment of the present application, the compound of Formula IV includes at least one of
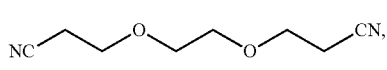
(Formula IV-1)
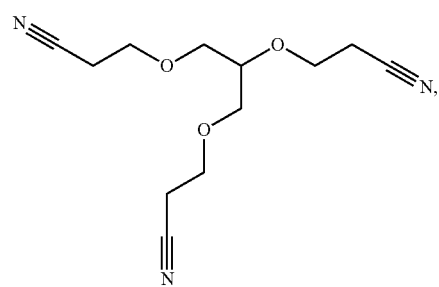
(Formula IV-2)
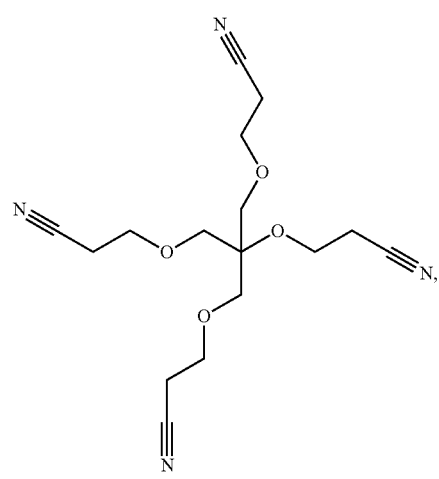
(Formula IV-3)
(Formula IV-4)
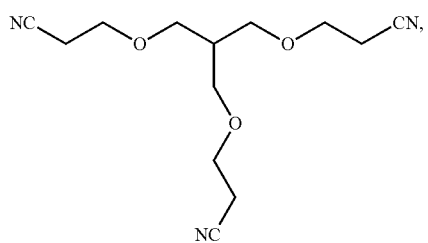
(Formula IV-5)
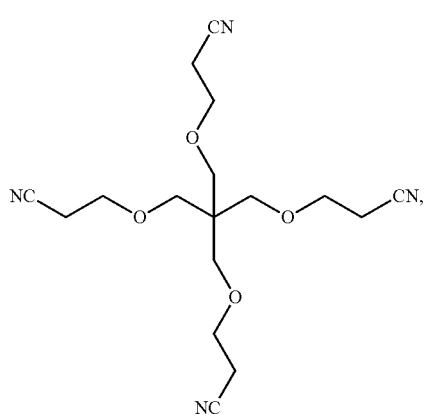
(Formula IV-6)
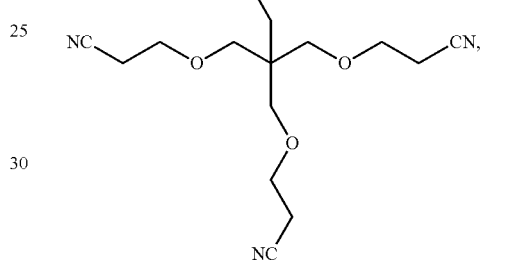
(Formula IV-7)
(Formula IV-8)
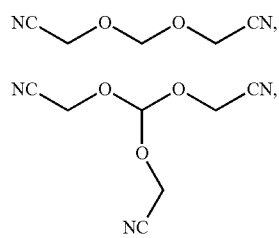
(Formula IV-9)
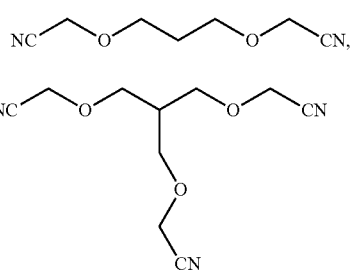
(Formula IV-10)
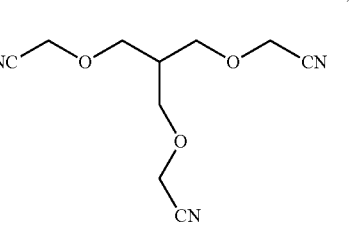
(Formula IV-11) or

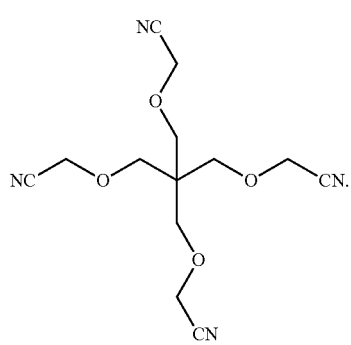

(Formula IV-12)

According to an embodiment of the present application, based on the total weight of the electrolyte, the total content of the compound of Formula I, the compound of Formula II or the compound of Formula III is 0.01 wt % to 10 wt %, and the total content of the compound of Formula IV is 0.01 wt % to 8 wt %.

According to an embodiment of the present application, the electrolyte further comprises an additive A that includes at least one of fluoroethylene carbonate, vinylene carbonate, vinyl ethylene carbonate, succinonitrile, adiponitrile, 1,3,6-hexanetricarbonitrile, 1,3,2-dioxathiolane-2,2-dioxide, 1,3-propane sultone or fluorobenzene.

According to an embodiment of the present application, the total content of the additive A is 1 wt % to 12 wt % based on the total weight of the electrolyte.

According to an embodiment of the present application, the electrolyte further comprises lithium difluorophosphate ($LiPO_2F_2$). The content of lithium difluorophosphate is 0.01 wt % to 1.5 wt % based on the total weight of the electrolyte. In some embodiments, the content of lithium difluorophosphate is 0.01 wt % to 0.49 wt % based on the total weight of the electrolyte.

According to an embodiment of the present application, the electrolyte further comprises a compound of Formula V:

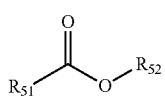

(Formula V)

wherein:
$R_{51}$ and $R_{52}$ are each independently selected from $C_1$-$C_4$ alkyl or $C_1$-$C_4$ fluoroalkyl; and
at least one of $R_{51}$ and $R_{52}$ is $C_1$-$C_4$ fluoroalkyl.

According to an embodiment of the present application, the content of the compound of Formula V is 1 wt % to 30 wt % based on the total weight of the electrolyte.

According to an embodiment of the present application, the compound of Formula V includes at least one of

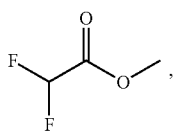

(Formula V-1)

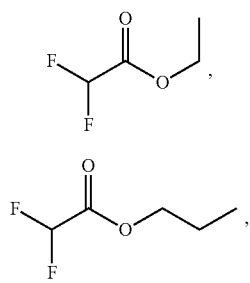

(Formula V-2)

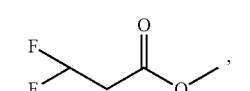

(Formula V-3)

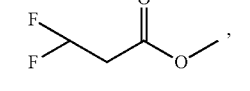

(Formula V-4)

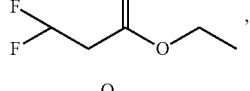

(Formula V-5)

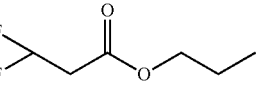

(Formula V-6)

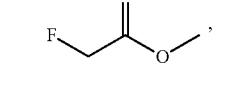

(Formula V-7)

(Formula V-8)

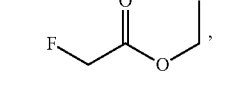

(Formula V-9)

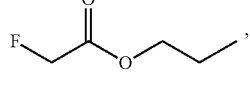

(Formula V-10)

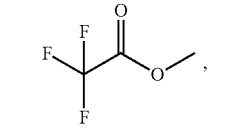

(Formula V-11)

or

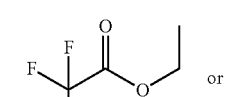

(Formula V-12)

According to another aspect of the present application, the present application provides an electrochemical device comprising a cathode; an anode including an anode active material layer; and an electrolyte according to the present application.

According to an embodiment of the present application, the ratio C004/C110 of the peak area C004 of the (004) plane to the peak area C110 of the (110) plane of the anode active material layer obtained by an X-ray diffraction pattern is in the range of 8 to 15.

According to an embodiment of the present application, the anode active material layer comprises primary particles and secondary particles, wherein the Dv50 of the primary particles is in the range of 3 μm to 10 μm and the Dv50 of the secondary particles is in the range of 5 μm to 20 μm.

According to an embodiment of the present application, the weight ratio of the primary particles to the secondary particles is 1:9 to 5:5.

According to another aspect of the present application, the present application provides an electronic device comprising an electrochemical device according to the present application.

Additional aspects and advantages of the present application will be described or shown in the following description or interpreted by implementing the embodiments of the present application.

DETAILED DESCRIPTION

The embodiments of the present application will be described in detail below. The embodiments of the present application should not be interpreted as limitations to the present application.

In the detailed description and the claims, a list of items connected by the term "at least one of" may mean any combination of the listed items. For example, if items A and B are listed, then the phrase "at least one of A and B" means only A; only B; or A and B. In another example, if items A, B and C are listed, then the phrase "at least one of A, B and C" means only A; or only B; only C; A and B (excluding C); A and C (excluding B); B and C (excluding A); or all of A, B and C. The item A may include a single component or multiple components. The item B may include a single component or multiple components. The item C may include a single component or multiple components.

As used herein, the term "alkyl" is intended to be a linear saturated hydrocarbon structure having 1 to 20 carbon atoms. "Alkyl" is also intended to be a branched or cyclic hydrocarbon structure having 3 to 20 carbon atoms. When an alkyl group having a specific number of carbon atoms is defined, it is intended to cover all geometric isomers having the carbon number. Therefore, for example, "butyl" means n-butyl, sec-butyl, isobutyl, tert-butyl and cyclobutyl; and "propyl" includes n-propyl, isopropyl and cyclopropyl. Examples of the alkyl group include, but are not limited to, methyl, ethyl, n-propyl, isopropyl, cyclopropyl, n-butyl, isobutyl, sec-butyl, tert-butyl, cyclobutyl, n-pentyl, isoamyl, neopentyl, cyclopentyl, methylcyclopentyl, ethylcyclopentyl, n-hexyl, isohexyl, cyclohexyl, n-heptyl, octyl, cyclopropyl, cyclobutyl, norbornanyl and so on.

As used herein, the term "alkylene" means a linear or branched divalent saturated hydrocarbyl group. Unless otherwise defined, the alkylene group typically contains from 2 to 10 carbon atoms and includes (for example) $C_2$-$C_3$ alkylene and $C_2$-$C_6$ alkylene. Representative alkylene group includes (for example) methylene, ethane-1,2-diyl ("ethylene"), propane-1,2-diyl, propane-1,3-diyl, butane-1,4-diyl, pentane-1,5-diyl and the like.

As used herein, the term "alkenyl" refers to a monovalent unsaturated hydrocarbyl group which may be straight or branched and which has at least one and usually 1, 2 or 3 carbon-carbon double bonds. Unless otherwise defined, the alkenyl group typically contains from 2 to 20 carbon atoms and includes (for example) $C_2$-$C_4$ alkenyl, $C_2$-$C_6$ alkenyl, and $C_2$-$C_{10}$ alkenyl. Representative alkenyl groups include (for example) ethenyl, n-propenyl, iso-propenyl, n-but-2-enyl, butyl-3-enyl, n-hex-3-enyl, and the like.

As used herein, the term "alkenylene" means a bifunctional group obtained by removing one hydrogen atom from an alkenyl group as defined above. Preferred alkenylene includes, but is not limited to, —CH=CH—, —C(CH₃)=CH—, —CH=CHCH₂—, and the like.

As used herein, the term "aryl" means a monovalent aromatic hydrocarbon group having a single ring (for example, phenyl) or a fused ring. The fused ring system includes a completely unsaturated ring system (for example, naphthalene) and a partially unsaturated ring system (for example, 1,2,3,4-tetrahydronaphthalene). Unless otherwise defined, the aryl group typically contains from 6 to 26 ring carbon atoms and includes (for example) $C_6$-$C_{10}$ aryl. Representative aryl group includes (for example) phenyl, methylphenyl, propylphenyl, isopropylphenyl, benzyl and naphthalen-1-yl, naphthalen-2-yl and the like.

As used herein, the term "cyano" encompasses an organic radical containing the organic group —CN.

As used herein, the term "halo" refers to a stable atom belonging to Group 17 of the periodic table of elements, such as fluorine, chlorine, bromine, or iodine.

As used herein, the term "substituted or unsubstituted" means that a particular group is unsubstituted or substituted with one or more substituents. When the above substituents are substituted, the substituent is selected from the group consisting of halo, an alkyl group, a cycloalkyl group, an alkenyl group, an aryl group, and a heteroaryl group.

Electrolyte

The present application provides an electrolyte comprising at least one of a compound of Formula I, a compound of Formula II or a compound of Formula III; and a compound of Formula IV:

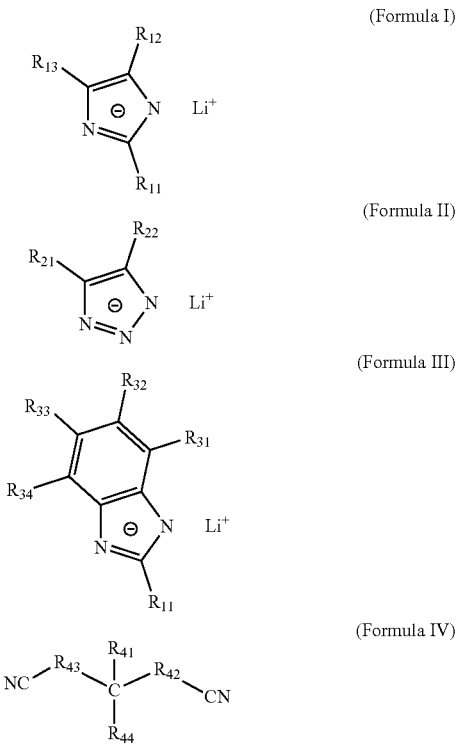

wherein:
$R_{11}$, $R_{12}$, $R_{13}$, $R_{21}$, $R_{22}$, $R_{31}$, $R_{32}$, $R_{33}$ and $R_{34}$ are each independently selected from H, halo, cyano, substituted or unsubstituted $C_1$-$C_{10}$ alkyl, substituted or unsubstituted $C_2$-$C_{10}$ alkenyl, and substituted or unsubstituted $C_6$-$C_{12}$ aryl;

$R_{41}$ and $R_{44}$ are each independently selected from H, F, cyano, substituted or unsubstituted $C_1$-$C_{10}$ alkyl, substituted or unsubstituted $C_2$-$C_{10}$ alkenyl, substituted or unsubstituted $C_6$-$C_{12}$ aryl, $R^a$—(O—$R^b$), or (O—$R^b$); and $R_{42}$ and $R_{43}$ are each independently selected from $R^a$—(O—$R^d$) or (O—$R^d$);

wherein $R^b$ is selected from substituted or unsubstituted $C_1$-$C_4$ alkyl;

$R^a$, $R^c$ and $R^d$ are each independently selected from substituted or unsubstituted $C_1$-$C_4$ alkylene, $C_2$-$C_5$ alkenylene, or $C_6$-$C_{12}$ aryl; and when substituted, the substituent is selected from halo, cyano or a combination thereof.

At least one of the compounds of Formula I, Formula II or Formula III, work together with the compound of Formula IV to improve the stability of the electrolyte, effectively reducing the damage of the solid-electrolyte interface (SEI) film during the cycle process of the lithium-ion batteries, and reducing the consumption of the electrolyte, thereby improving the high-temperature interval cycle performance of the lithium ion batteries.

During high-temperature storage, the lithium salt tends to decompose (for example, $LiPF_6$ tends to decompose into HF and $PF_6$), making the electrolyte acidic. Under acidic conditions, the oxidation of the electrolyte at the surface of the cathode speeds up, causing the transition metal in the cathode to dissolve, which destroys the performance of the lithium-ion battery. The compound of Formula IV has an oxy group (—O—), which forms a bond with the decomposed product of the lithium salt (such as HF and $PF_6$) to reduce the solvent decomposition in the electrolyte.

The electrolyte comprises at least one compound selected from the group consisting of a compound of Formula I, a compound of Formula II and a compound of Formula III; and the compound of Formula IV, which can stabilize the anode interface, protect the cathode surface, and avoid any contact between the oxidizable component and the cathode interface, thereby effectively improving the high-temperature interval cycle performance and high-temperature storage performance of the lithium ion batteries.

According to an embodiment of the present application, the compound of Formula I is selected from at least one of the following compounds:

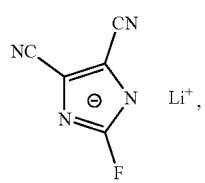
(Formula I-1)

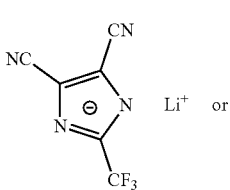
(Formula I-2) or

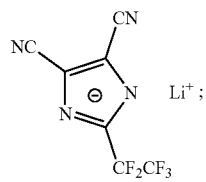
(Formula I-3)

the compound of Formula II is

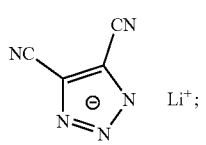
(Formula II-1)

and the compound of Formula III is

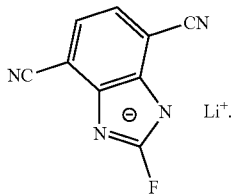
(Formula III-1)

According to an embodiment of the present application, the compound of Formula IV includes at least one of

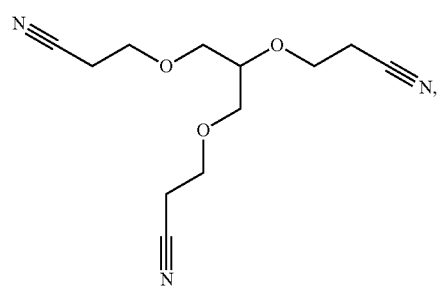
(Formula IV-1)

(Formula IV-2)

(Formula IV-3)

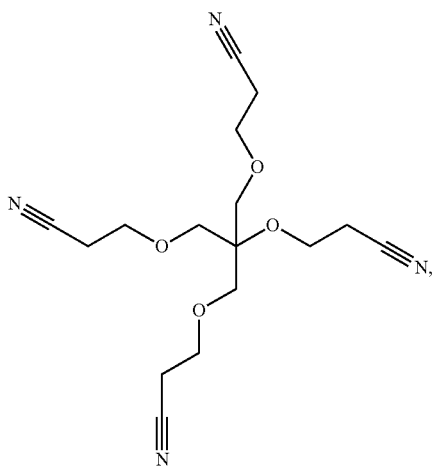

(Formula IV-4)

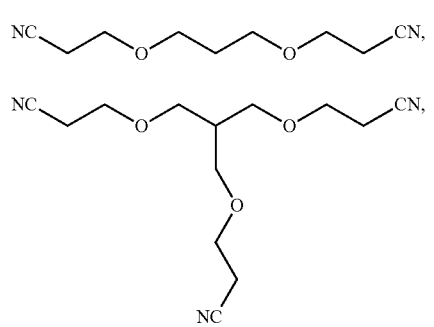

(Formula IV-5)

(Formula IV-6)

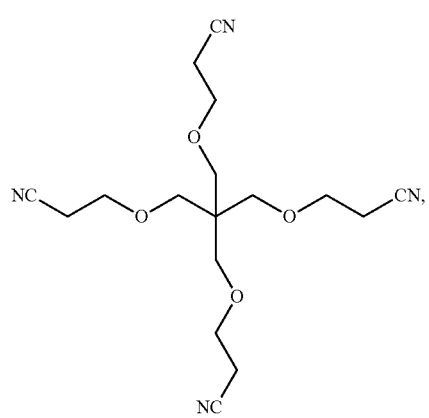

(Formula IV-7)

(Formula IV-8)

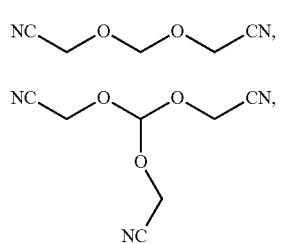

(Formula IV-9)

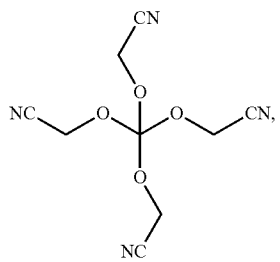

(Formula IV-10)

(Formula IV-11)

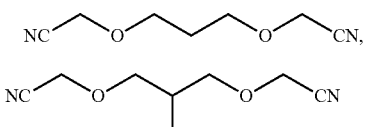

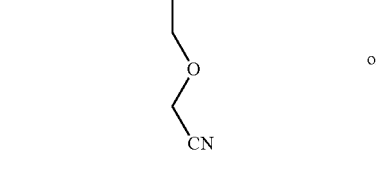

or (Formula IV-12)

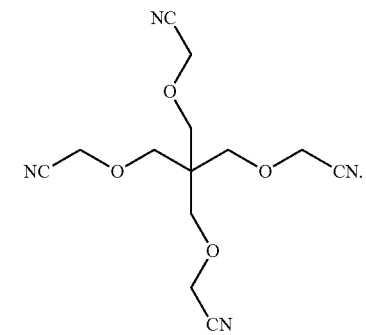

According to an embodiment of the present application, the total content of the compound of Formula I, the compound of Formula II or the compound of Formula III is 0.01 wt % to 10 wt % based on the total weight of the electrolyte. In some embodiments, the content of the compound of Formula I, Formula II or Formula III is 0.05 wt % to 8 wt % based on the total weight of the electrolyte. In some embodiments, the content of the compound of Formula I, Formula II or Formula III is 0.1 wt % to 5 wt % based on the total weight of the electrolyte. In some embodiments, the content of the compound of Formula I, Formula II or Formula III is 0.5 wt % to 6 wt % based on the total weight of the electrolyte. In some embodiments, the content of the compound of Formula I, Formula II or Formula III is 1 wt % to 3 wt % based on the total weight of the electrolyte. In some embodiments, the content of the compound of Formula I, Formula II or Formula III is 10 wt %, 8 wt %, 5 wt %, 3 wt %, 2 wt %, 1 wt %, 0.5 wt %, 0.3 wt %, 0.1 wt %, 0.05 wt % or 0.01 wt % based on the total weight of the electrolyte.

According to an embodiment of the present application, the content of the compound of Formula IV is 0.01 wt % to 8 wt %. In some embodiments, the content of the compound of Formula IV is 0.05 wt % to 8 wt % based on the total weight of the electrolyte. In some embodiments, the content of the compound of Formula IV is 0.1 wt % to 6 wt % based on the total weight of the electrolyte. In some embodiments, the content of the compound of Formula IV is 0.5 wt % to 5 wt % based on the total weight of the electrolyte. In some embodiments, the content of the compound of Formula IV is 1 wt % to 3 wt % based on the total weight of the electrolyte. In some embodiments, the content of the compound of Formula IV is 8 wt %, 5 wt %, 3 wt %, 2 wt %, 1 wt %, 0.5 wt %, 0.3 wt %, 0.1 wt %, 0.05 wt % or 0.01 wt % based on the total weight of the electrolyte.

According to an embodiment of the present application, the electrolyte further comprises lithium difluorophosphate ($LiPO_2F_2$), the content of lithium difluorophosphate is 0.01 wt % to 1.5 wt % based on the total weight of the electrolyte. In some embodiments, the content of lithium difluorophosphate ($LiPO_2F_2$) is 0.01 wt % to 1 wt % based on the total weight of the electrolyte. In some embodiments, the content of lithium difluorophosphate ($LiPO_2F_2$) is 0.01 wt % to 0.8 wt % based on the total weight of the electrolyte. In some embodiments, the content of lithium difluorophosphate ($LiPO_2F_2$) is 0.01 wt % to 0.6 wt % based on the total weight of the electrolyte. In some embodiments, the content of lithium difluorophosphate ($LiPO_2F_2$) is 0.01 wt % to 0.49 wt % based on the total weight of the electrolyte.

According to an embodiment of the present application, the electrolyte further comprises an additive A that includes at least one of fluoroethylene carbonate (FEC), vinylene carbonate (VC), vinyl ethylene carbonate (VEC), succinonitrile (SN), adiponitrile (ADN), 1,3,6-hexanetricarbonitrile, 1,3,2-dioxathiolane-2,2-dioxide (DTD), 1,3-propane sultone (PS) or fluorobenzene.

In some embodiments, the electrolyte comprises VC, and the content of VC is 0.01 wt % to 5 wt % based on the total weight of the electrolyte. When the content is in such a range, VC can fully affect the formation of the solid-electrolyte interface (SEI) film on the anode surface, and significantly improve cycle performance and gas production during storage of the secondary batteries with high energy density.

In some embodiments, the electrolyte comprises FEC, and the content of FEC is 0.01 wt % to 10 wt % based on the total weight of the electrolyte. When the content is in such a range, FEC can fully affect the formation of the solid-electrolyte interface (SEI) film on the anode surface, and significantly improve cycle performance of the electrochemical device with high energy density.

In some embodiments, the electrolyte comprises ADN or SN, and the content of ADN or SN is 0.01 wt % to 10 wt % based on the total weight of the electrolyte. When the content is in such a range, ADN or SN can further stabilize the cathode structure, and further improve cycle performance and gas production during storage.

In some embodiments, the content of the additive A is 1 wt % to 12 wt % based on the total weight of the electrolyte.

According to an embodiment of the present application, the electrolyte further comprises at least a compound of Formula V:

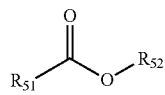
(Formula V)

wherein:
$R_{51}$ and $R_{52}$ are each independently selected from $C_1$-$C_4$ alkyl or $C_1$-$C_4$ fluoroalkyl; and
at least one of $R_{51}$ and $R_{52}$ is $C_1$-$C_4$ fluoroalkyl.

According to an embodiment of the present application, the content of the compound of Formula V is 1 wt % to 30 wt % based on the total weight of the electrolyte.

On the basis of the electrolyte comprising at least one of the compounds of Formula I, the compound of Formula II or the compound of Formula III; and the compound of Formula IV, the further inclusion of the compound of Formula V can further improve the high-temperature interval cycle performance and high-temperature storage performance of lithium ion batteries. At least one of the compounds of Formula I, the compound of Formula II or the compound of Formula III; the compound of Formula IV, and the compound of Formula V work together to allow the electrolyte to have a lower viscosity and higher flash point and thermal stability. Moreover, the electrolyte which has higher electrochemical stability can further improve the high-temperature interval cycle performance, expansion upon high-temperature storage and recoverable capacity after storage of lithium-ion batteries.

According to an embodiment of the present application, the compound of Formula V includes at least one of

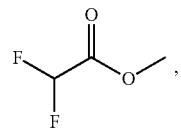
(Formula V-1)

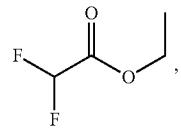
(Formula V-2)

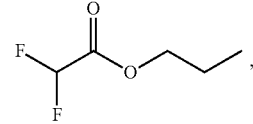
(Formula V-3)

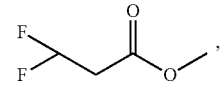
(Formula V-4)

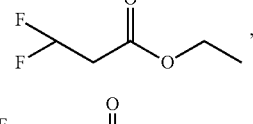
(Formula V-5)

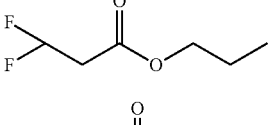
(Formula V-6)

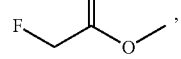
(Formula V-7)

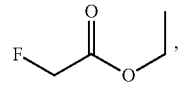
(Formula V-8)

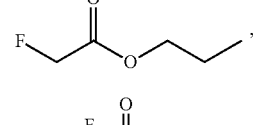
(Formula V-9)

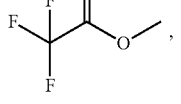
(Formula V-10)

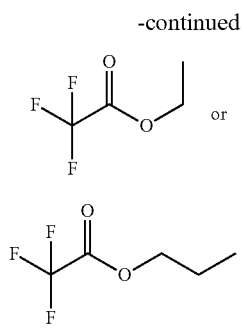

(Formula V-11) or (Formula V-12).

According to an embodiment of the present application, the content of the compound of Formula V is 1 wt % to 30 wt %. In some embodiments, the content of the compound of Formula V is 3 wt % to 25 wt % based on the total weight of the electrolyte. In some embodiments, the content of the compound of Formula V is 3 wt % to 15 wt % based on the total weight of the electrolyte. In some embodiments, the content of the compound of Formula V is 12 wt % to 15 wt % based on the total weight of the electrolyte. In some embodiments, the content of the compound of Formula V is 30 wt %, 28 wt %, 25 wt %, 20 wt %, 18 wt %, 15 wt %, 12 wt %, 10 wt %, 8 wt %, 5 wt %, 3 wt % or 1 wt % based on the total weight of the electrolyte.

In some embodiments, the electrolyte further comprises an organic solvent including, but not limited to, a carbonate, a carboxylate, or a combination thereof. In some embodiments, the carbonate may be any type of carbonate, as long as it can be used as an organic solvent for a non-aqueous electrolyte, which may be a cyclic carbonate or a chain carbonate. In some embodiments, the cyclic carbonate is ethylene carbonate, propylene carbonate, butylene carbonate, γ-butyrolactone, or pentylene carbonate. In some embodiments, the chain carbonate may be dimethyl carbonate, diethyl carbonate, dipropyl carbonate, ethyl methyl carbonate, and so on, but is not limited to the above; and may also be a halogenated derivative thereof. In some embodiments, the carboxylate may be methyl propionate, methyl butyrate, ethyl acetate, ethyl propionate, propyl propionate, ethyl butyrate.

According to an embodiment of the present application, the electrolyte further comprises a lithium salt selected from at least one of inorganic lithium salts and organic lithium salts. In some embodiments, the lithium salt includes, but is not limited to, lithium hexafluorophosphate (LiPF$_6$), lithium tetrafluoroborate (LiBF$_4$), lithium hexafluoroarsonate, lithium perchlorate, lithium bis(fluorosulphonyl)imide (LiFSI), lithium bis(trifluoromethanesulphonyl)imide (LiTFSI), lithium bis(oxalato)borate LiB(C$_2$O$_4$)$_2$(LiBOB), or lithium difluoro(oxalato)borate LiBF$_2$(C$_2$O$_4$)(LiDFOB). In some embodiments, the lithium salt is lithium hexafluorophosphate (LiPF$_6$). In some embodiments, the content of the lithium salt is 0.6 M to 2 M. In some embodiments, the content of the lithium salt is 0.8 M to 1.2 M.

The electrolyte of the present application can be prepared by any known method. In some embodiments, the electrolyte of the present application can be prepared by mixing various components.

Anode

The anode includes an anode current collector and an anode active material layer disposed on the anode current collector. The specific types of the anode active material are not particularly limited, and may be selected as desired.

In some embodiments, the anode current collector is selected from copper foil, nickel foil, stainless steel foil, titanium foil, foamed nickel, foamed copper, polymeric substrates coated with a conductive metal, and combinations thereof.

In some embodiments, the anode active material is one or more selected from natural graphite, artificial graphite, mesocarbon microbead (MCMB), hard carbon, soft carbon, silicon, silicon-carbon composite, Li—Sn alloy, Li—Sn—O alloy, Sn, SnO, SnO$_2$, lithiated TiO$_2$—Li$_4$TisO$_{12}$ having a spinel structure, and Li—Al alloy. Non-limiting examples of carbon materials include crystalline carbon, amorphous carbon, and mixtures thereof. The crystalline carbon may be formless or plate-shaped, platelet-shaped, spherical or fibrous natural graphite or artificial graphite. The amorphous carbon may be soft carbon, hard carbon, carbonized mesophase pitch, calcined coke, and the like.

In some embodiments, the anode active material comprises a binder. The binder increases the binding of the anode active material particles to each other and the binding of the anode active material to the current collector. Non-limiting examples of the binder include, but are not limited to, polyvinyl alcohol, carboxymethyl cellulose, hydroxypropyl cellulose, diacetyl cellulose, polyvinyl chloride, carboxylated polyvinyl chloride, polyvinyl fluoride, a polymer containing ethylene oxide, polyvinylpyrrolidone, polyurethane, polytetrafluoroethylene, poly(1,1-vinylidene fluoride), polyethylene, polypropylene, styrene butadiene rubber, acrylated styrene butadiene rubber, epoxy resins, Nylon and so on.

In some embodiments, the anode active material comprises a conductive material to impart conductivity to the electrode. The conductive material may include any conductive material as long as it does not cause a chemical change. Non-limiting examples of the conductive material include a carbon-based material (e.g., natural graphite, artificial graphite, carbon black, acetylene black, ketjen black, carbon fiber, etc.), a metal-based material (e.g., a metal powder, a metal fiber, etc., including for example copper, nickel, aluminum, silver, and so on), a conductive polymer (for example, a polyphenylene derivative) and a mixture thereof.

In some embodiments, the ratio C004/C110 of the peak area C004 of the (004) plane to the peak area C110 of the (110) plane of the anode active material layer obtained by an X-ray diffraction pattern is in the range of 8 to 15. In some embodiments, the C004/C110 is 8, 9, 10, 11, 12, 13, 14 or 15.

The C004/C110 value can reflect the orientation of the anode active material layer. The greater the C004/C110 value is, the greater the anisotropy of the anode active material layer will be. During the cycle process of lithium-ion batteries, the carbon coating with a high C004/C110 value tends to undergo interlayer expansion, that is, expansion in the Z direction (vertical direction), and is unlikely to undergo expansion in the X/Y direction. A C004/C110 value of the anode active material layer in the range of 8 to 15 can suppress or neutralize the stress caused by the intercalation or deintercalation of lithium ions during the high-temperature interval cycle process, thereby effectively alleviating the expansion of lithium ion batteries during the high-temperature interval cycle process.

In some embodiments, the anode active material layer comprises primary particles and secondary particles, wherein the Dv50 of the primary particles is in the range of 3 μm to 10 μm and the Dv50 of the secondary particles is in the range of 5 μm to 20 μm. In some embodiments, the primary particles have a Dv50 in the range of 5 to 8 μm. In some embodiments, the primary particles have a Dv50 of 3 µm, 4 µm, 5 µm, 6 µm, 7 µm, 8 µm, 9 µm or 10 µm. In some embodiments, the secondary particles have a Dv50 in the range of 8 to 18 µm. In some embodiments, the secondary particles have a Dv50 in the range of 10 to 15 µm. In some embodiments, the secondary particles have a Dv50 of 5 µm, 6 m, 7 µm, 8 µm, 9 µm, 12 µm, 14 µm, 16 µm or 18 µm.

In some embodiments, the weight ratio of the primary particles to the secondary particles is 1:9 to 5:5. In some embodiments, the weight ratio of the primary particles to the secondary particles is 1:8 to 3:4. In some embodiments, the weight ratio of the primary particles to the secondary particles is 1:6 to 2:3. In some embodiments, the weight ratio of the primary particles to the secondary particles is 1:5 to 1:2. In some embodiments, the weight ratio of the primary particles to the secondary particles is 1:4 to 1:3.

The presence of secondary particles in the anode active material layer increases the compression face of the anode during the compression process so that the direction of the force increases, thereby showing that an angle with respect to the plane of the current collector is still maintained after the anode is compressed. During the high-temperature interval cycle process of the lithium-ion battery, the stress generated by the intercalation or deintercalation of lithium ions into/from the anode active material layer can be suppressed or neutralized by forces from all directions, thereby greatly alleviating the expansion in thickness direction of the lithium-ion battery during the high-temperature interval cycle process. The alleviation of the expansion of lithium-ion batteries can reduce the contact area of the anode active material with the electrolyte, thereby reducing the SEI film that needs to be formed on the surface of the anode, and reducing the consumption of electrolyte. Therefore, with the same electrolyte content, the use of the anode active material layer can further improve the high-temperature interval cycle performance of lithium ion batteries.

Cathode

The cathode includes a cathode current collector and a cathode active material disposed on the cathode current collector. The cathode active material comprises a compound that reversibly intercalates and deintercalates lithium ions. The cathode active material comprises a composite oxide which contains lithium and at least one element selected from cobalt, manganese, or nickel. The specific types of the cathode active material are not particularly limited, and may be selected as desired. In some embodiments, the cathode active material is at least one selected from the group consisting of lithium cobalt oxide ($LiCoO_2$), a lithium nickel manganese cobalt ternary material, lithium manganese oxide ($LiMn_2O_4$), lithium nickel manganese oxide ($LiNi_{0.5}Mn_{1.5}O_4$), and lithium iron phosphate ($LiFePO_4$). In some embodiments, the cathode active material is a mixture of lithium cobalt oxide and a lithium nickel manganese cobalt ternary material. In some embodiments, in the mixture of lithium cobalt oxide and lithium nickel manganese cobalt ternary material, the mixing ratio of lithium cobalt oxide to lithium nickel manganese cobalt ternary material meets 1:9<lithium cobalt oxide:lithium nickel manganese cobalt<9:1. In some embodiments, in the mixture of lithium cobalt oxide and lithium nickel manganese cobalt ternary material, the mixing ratio of lithium cobalt oxide to lithium nickel manganese cobalt ternary material meets 2:8<lithium cobalt oxide:lithium nickel manganese cobalt<4:6. The combination of lithium cobalt oxide and lithium nickel manganese cobalt increases the amount of transition metals, wherein the transition metal has a catalytic effect on the film formation of the electrolyte, thus improving the safety performance of the cathode active material.

In some embodiments, the cathode active material has a coating on the surface. In some embodiments, the coating includes at least one of an oxide of a coating element, a hydroxide of a coating element, an oxyhydroxide of a coating element, an oxycarbonate of a coating element, or a hydroxycarbonate of a coating element. The coating element contained in the coating may include Mg, Al, Co, K, Na, Ca, Si, Ti, V, Sn, Ge, Ga, B, As, Zr or a mixture thereof. The compound used for the coating may be amorphous or crystalline. The coating can be applied by any method as long as the method does not adversely affect the performance of the cathode active material. The method of applying the coating may include any coating method known to those skilled in the art, such as spraying, dipping, and others.

In some embodiments, the cathode active material layer further comprises a binder. The binder increases the binding of the cathode active material particles to each other and the binding of the cathode active material to the cathode current collector. In some embodiments, the binder includes, but is not limited to, polyvinyl alcohol, hydroxypropyl cellulose, diacetyl cellulose, polyvinyl chloride, carboxylated polyvinyl chloride, polyvinyl fluoride, a polymer containing ethylene oxide, polyvinylpyrrolidone, polyurethane, polytetrafluoroethylene, poly(1,1-vinylidene fluoride), polyethylene, polypropylene, styrene butadiene rubber, acrylated styrene butadiene rubber, epoxy resins, Nylon and so on.

In some embodiments, the cathode active material layer further comprises a conductive material to impart conductivity to the electrode. The conductive material may include any conductive material as long as it does not cause a chemical change. Non-limiting examples of the conductive material include a carbon-based material (e.g., natural graphite, artificial graphite, carbon black, acetylene black, ketjen black, and carbon fiber, etc.), a metal-based material (e.g., a metal powder, and a metal fiber, etc., including for example copper, nickel, aluminum, silver, and so on), a conductive polymer (for example, a polyphenylene derivative) and a mixture thereof.

In some embodiments, the cathode current collector includes, but is not limited to, aluminum (Al).

Separator

In some embodiments, a separator is provided between the cathode and the anode to prevent short circuit. The material and shape of the separator are not particularly limited, and may be any of the techniques disclosed in the prior art. In some embodiments, the separator includes a polymer or an inorganic substance or the like formed of a material which is stable against the electrolyte of the present application.

In some embodiments, the separator includes a substrate layer. In some embodiments, the substrate layer is a nonwoven fabric, a film or a composite film having a porous structure. In some embodiments, the material of the substrate layer is at least one selected from the group consisting of polyethylene, polypropylene, polyethylene terephthalate, and polyimide. In some embodiments, the material of the substrate layer may be selected from the group consisting of a porous polypropylene film, a porous polyethylene film, a polypropylene nonwoven fabric, a polyethylene nonwoven fabric, and a porous polypropylene-polyethylene-polypropylene composite film.

In some embodiments, at least one surface of the substrate layer is provided with a surface treatment layer. In some embodiments, the surface treatment layer may be a polymer layer or an inorganic layer, or a layer formed by mixing a polymer and an inorganic material. In some embodiments, the polymer layer contains a polymer, and the material of the polymer is selected from at least one of a polyamide, polyacrylonitrile, a polyacrylate ester, polyacrylic acid, a polyacrylate salt, polyvinylpyrrolidone, polyvinyl ether, polyvinylidene fluoride or poly(vinylidene fluoride-hexafluoropropylene).

In some embodiments, the inorganic layer includes inorganic particles and a binder. In some embodiments, the inorganic particles are selected from one of alumina, silica, magnesia, titania, hafnium dioxide, tin oxide, cerium dioxide, nickel oxide, zinc oxide, calcium oxide, zirconia, yttria, silicon carbide, eboehmite, aluminum hydroxide, magnesium hydroxide, calcium hydroxide and barium sulfate, or a combination of more than one thereof. In some embodiments, the binder is selected from one of polyvinylidene fluoride, a copolymer of vinylidene fluoride-hexafluoropropylene, a polyamide, polyacrylonitrile, a polyacrylate ester, polyacrylic acid, a polyacrylate salt, polyvinylpyrrolidone, polyvinyl ether, polymethyl methacrylate, polytetrafluoroethylene, and polyhexafluoropropylene, or a combination of more than one thereof.

Electrochemical Device

The electrochemical device of the present application includes any device where an electrochemical reaction takes place, and specific examples include all kinds of primary batteries, secondary batteries, fuel cells, solar cells, or capacitors. In particular, the electrochemical device is a lithium secondary battery including a lithium metal secondary battery, a lithium ion secondary battery, a lithium polymer secondary battery or a lithium ion polymer secondary battery.

Electronic Device

The present application further provides an electronic device comprising an electrochemical device according to the present application.

The use of the electrochemical device of the present application is not particularly limited and can be used in any electronic device known in the art. In some embodiments, the electrochemical device according to the present application is applicable to, but is not limited to, notebook computers, pen-input computers, mobile computers, e-book players, portable phones, portable fax machines, portable copiers, portable printers, head-mounted stereo headphones, video recorders, LCD TVs, portable cleaners, portable CD players, minidisc players, transceivers, electronic notebooks, calculators, memory cards, portable recorders, radios, backup power sources, motors, vehicles, motorcycles, scooters, bicycles, lighting apparatus, toys, game consoles, clocks, electric tools, flash lights, cameras, large batteries for household use, and lithium ion capacitors.

Hereinafter, a lithium ion battery is taken as an example and the preparation of a lithium ion battery is described in conjunction with specific embodiments. Those skilled in the art will understand that the preparation methods described in the present application are merely exemplary, and any other suitable preparation methods also fall within the protection scope of the present application.

Examples

The performance evaluation of the lithium ion batteries in the examples of the present application and comparative examples is described below.

I. Preparation of Lithium-Ion Battery

1. Preparation of Cathode

Lithium cobalt oxide LCO ($LiCO_2$), acetylene black and polyvinylidene fluoride (PVDF) were dissolved in N-methylpyrrolidone (NMP) as a solvent at a weight ratio of 96:2:2, stirred and mixed to prepare a cathode slurry. The cathode slurry was evenly coated on an aluminum foil as a cathode current collector, dried, and then cold-pressed to obtain the cathode.

2. Preparation of Anode

Artificial graphite, styrene-butadiene rubber (SBR) and sodium carboxymethyl cellulose (CMC) were dissolved in deionized water as a solvent at a weight ratio of 95:2:3, stirred and mixed to obtain an anode slurry. The anode slurry was evenly coated on a copper foil as an anode current collector, dried, and then cold-pressed to obtain the anode.

3. Preparation of Electrolyte

In a glove box under a dry argon atmosphere, ethylene carbonate (abbreviated as EC), diethyl carbonate (abbreviated as DEC), and propylene carbonate (abbreviated as PC) were mixed uniformly at a weight ratio of 3:4:3. The components shown in each example and comparative example in the tables below were added, dissolved, and stirred fully. Then the lithium salt $LiPF_6$ was added, and mixed until uniform to obtain the electrolyte. The concentration of $LiPF_6$ in the electrolyte was 1 mol/L.

4. Preparation of Separator

A polyethylene (PE) porous polymer film was used as the separator.

5. Preparation of Lithium-Ion Battery The cathode, the separator, and the anode were laminated in order such that the separator was located between the cathode and the anode. Then, they were wound up, and placed in the outer packaging foil. The electrolyte prepared above was injected, and after vacuum packaging, standing, formation, shaping, and other procedures, a lithium ion battery was obtained.

II. Test Methods

1. Test Method for High-Temperature Interval Cycle Performance of Lithium Ion Battery The lithium-ion battery was placed in a thermostatic oven at 45° C., charged to 4.4V at a constant current of 0.5 C and then to 0.05 C at a constant voltage of 4.4V, held for 19.5 h, and then discharged to 3.0 V at a constant current of 0.5 C. This was a charge and discharge cycle. 23 cycles were repeated according to the above manner. After 23 cycles, the lithium-ion battery was charged to 4.35V at 0.5 C and then to 0.05 C at a constant voltage of 4.35V, held for 19 h, and then discharged to 3.0 V at a constant current of 0.5 C. This was a charge and discharge cycle. 113 cycles were repeated according to the above manner. The capacity and thickness of the lithium-ion battery were monitored, and the capacity retention rate and thickness growth rate after high-temperature interval cycles were calculated by the following formulas:

Capacity retention rate=remaining discharge capacity/initial discharge capacity×100%

Thickness growth rate after high-temperature interval cycles (%)=Thickness after high-temperature interval cycles/initial thickness×100%

2. Test Method for High-Temperature Storage Performance of Lithium Ion Battery

The lithium-ion battery was placed in a thermostatic oven at 25° C., and charged to 4.4V at a constant current of 0.7 C. The initial thickness of the lithium-ion battery was measured. The lithium-ion battery was charged to 0.05 C at a constant voltage of 4.4V, and then discharged to 3.0 V at a constant current of 1.0 C. The initial discharge capacity of the lithium ion battery was measured. The lithium ion battery was then placed in a thermostatic oven at 60° C. for 30 days. After storage, the thickness of the lithium-ion battery after high-temperature storage was measured, and the recovered capacity after high-temperature storage was measured by the same method as for the initial discharge capacity. The thickness growth rate after high-temperature storage, and capacity recovery rate after high-temperature storage of the lithium-ion battery were calculated by the following formulas:

Thickness growth rate after high-temperature storage (%)=Thickness after high-temperature storage/initial thickness×100%

Capacity recovery rate after high-temperature storage (%)=recovered capacity after high temperature storage/initial discharge capacity×100%

3. Test Method for C004/C110 Value

The 004 diffraction pattern and the 110 diffraction pattern in the X-ray diffraction pattern of the anode active material layer on the anode were measured according to the People's Republic of China Machinery Industry Standard JB/T 4220-2011 "Determination method of artificial graphite lattice parameter". The test conditions were as follows: X-rays were generated by $CuK_\alpha$, and the $CuK_\alpha$ radiation was filtered through a filter or monochromator. The working voltage of the X-ray tube was (30-35) kV, and the working current was (15-20) mA. The scanning speed of the counter was ¼(°)/min. When the 004 diffraction pattern was recorded, the scanning range of the diffraction angle 2θ was 53°-57°. When the 110 diffraction pattern was recorded, the scanning range of the diffraction angle 2θ was 75°-79°. The peak area of the (004) plane obtained from the 004 diffraction pattern was recorded as C004. The peak area of the (110) plane obtained from the 110 diffraction pattern was recorded as C110.

III. Test Results

Table 1 shows the composition of the electrolyte used in the lithium ion batteries of Example 1-18 and Comparative Examples 1-3 and the high-temperature interval cycle performance, and high-temperature storage performance.

TABLE 1

| | Compound of Formula I, Formula II, or Formula III | | Compound of Formula IV | | High-temperature interval cycle performance | High-temperature storage performance | |
|---|---|---|---|---|---|---|---|
| | Compound structure | Content wt % | Compound structure | Content wt % | Capacity retention rate | Thickness growth rate | Capacity recovery rate |
| Example 1 | I-2 | 1 | IV-1 | 3 | 66.40% | 8.30% | 86.70% |
| Example 2 | I-2 | 1 | IV-2 | 2 | 66.70% | 8.50% | 85.80% |
| Example 3 | I-2 | 1 | IV-2 | 0.5 | 56.70% | 20.80% | 75.80% |
| Example 4 | I-2 | 1 | IV-9 | 3 | 65.80% | 7.50% | 87.30% |
| Example 5 | I-3 | 1 | IV-1 | 3 | 61.60% | 9.10% | 83.50% |
| Example 6 | I-3 | 1 | IV-2 | 2 | 62.00% | 9.50% | 80.60% |
| Example 7 | II-1 | 2 | IV-1 | 4 | 63.70% | 9.00% | 80.90% |
| Example 8 | II-1 | 2 | IV-9 | 4 | 64.30% | 8.70% | 81.30% |
| Example 9 | III-1 | 1 | IV-2 | 2 | 64.50% | 8.40% | 84.00% |
| Example 10 | I-2 | 0.1 | IV-2 | 3 | 58.40% | 7.50% | 85.40% |
| Example 11 | I-2 | 0.5 | IV-2 | 3 | 60.30% | 7.60% | 87.20% |
| Example 12 | I-2 | 1 | IV-2 | 3 | 68.90% | 7.20% | 86.60% |
| Example 13 | I-2 | 2 | IV-2 | 3 | 70.80% | 8.30% | 85.90% |
| Example 14 | I-2 | 5 | IV-2 | 3 | 71.40% | 10.90% | 82.40% |
| Example 15 | I-2 | 10 | IV-2 | 3 | 65.7% | 19.7% | 78.3% |
| Example 16 | I-2 | 1 | IV-2 | 5 | 70.10% | 7.60% | 87.20% |
| Example 17 | I-2 | 1 | IV-2 | 3 | 69.80% | 7.20% | 87.50% |
| | | | IV-9 | 3 | | | |
| Example 18 | I-2 | 1 | IV-1 | 2 | 69.40% | 7.00% | 87.70% |
| | | | IV-2 | 3 | | | |
| | | | IV-9 | 3 | | | |
| Comparative Example 1 | — | — | — | — | 45.20% | 26.10% | 71.30% |
| Comparative Example 2 | I-2 | 1 | — | — | 54.70% | 31.50% | 68.30% |
| Comparative Example 3 | — | — | IV-2 | 2 | 40.40% | 21.7% | 75.10% |

As shown in Comparative Examples 1-3, when an electrolyte does not contain the compound of Formula I, the compound of Formula II or the compound of Formula III, the compound of Formula IV, or the combination of the two types of compounds, the capacity retention rate after high-temperature interval cycles of the lithium ion battery is low, the expansion after high-temperature storage is severe, and the capacity recovery rate after high-temperature storage is low. As shown in Examples 1-18, when the electrolyte comprises at least one of the compounds of Formula I, the compound of Formula II or the compound of Formula III; and the compound of Formula IV, the low capacity retention rate after high-temperature interval cycles, the expansion after high-temperature storage, and/or the capacity recovery rate after high-temperature storage of the lithium ion battery can be significantly improved. When the total content of the compound of Formula I, the compound of Formula II or the compound of Formula III is in the range of 0.5 wt % to 5 wt % and the total content of the compound of Formula IV is in the range of 2 wt % to 5 wt % the improvement on performance of the lithium ion battery is particularly obvious.

Table 2 shows the influence of other components in the electrolyte on the high-temperature interval cycle performance and high-temperature storage performance of lithium-ion batteries. Specifically, Examples 19-33 show the high-temperature interval cycle performance and high-temperature storage performance of lithium-ion batteries after adding $LiPO_2F_2$, VC and/or ADN on the basis of Example 12.

TABLE 2

|  | $LiPO_2F_2$ (wt %) | VC (wt %) | ADN (wt %) | High-temperature interval cycle performance Capacity retention rate | High-temperature storage performance Thickness growth rate | High-temperature storage performance Capacity recovery rate |
|---|---|---|---|---|---|---|
| Example 12 | — | — | — | 68.90% | 7.20% | 86.60% |
| Example 19 | 0.1 | — | — | 69.20% | 7.14% | 87.20% |
| Example 20 | 0.3 | — | — | 69.70% | 7.10% | 87.90% |
| Example 21 | 0.49 | — | — | 70.10% | 6.80% | 88.10% |
| Example 22 | 0.8 | — | — | 70.20% | 6.50% | 88.20% |
| Example 23 | 1.5 | — | — | 69.90% | 6.90% | 87.70% |
| Example 24 | — | 0.1 | — | 70.50% | 7.90% | 86.50% |
| Example 25 | — | 0.5 | — | 70.70% | 8.30% | 85.30% |
| Example 26 | — | 1.5 | — | 71.30% | 9.00% | 84.60% |
| Example 27 | — | — | 1 | 69.50% | 7.10% | 87.60% |
| Example 28 | — | — | 3 | 69.70% | 6.20% | 88.30% |
| Example 29 | — | — | 5 | 70.00% | 5.90% | 88.70% |
| Example 30 | 0.3 | 0.1 | — | 71.10% | 7.00% | 87.40% |
| Example 31 | 0.3 | — | 2 | 70.60% | 5.50% | 89.00% |
| Example 32 | — | 0.1 | 2 | 71.00% | 6.70% | 87.60% |
| Example 33 | 0.3 | 0.1 | 2 | 71.60% | 6.20% | 88.00% |

The results show that after $LiPO_2F_2$, VC and/or ADN is further added to the electrolyte comprising at least one of the compounds of Formula I, the compound of Formula II or the compound of Formula III; and the compound of Formula IV, the low capacity retention rate after high-temperature interval cycles, the expansion after high-temperature storage, and the capacity recovery rate after high-temperature storage of the lithium ion battery are significantly improved.

Table 3 shows the high-temperature interval cycle performance and high-temperature storage performance of lithium ion batteries after the compound of Formula V is further added to the electrolyte comprising at least one of the compounds of Formula I, the compound of Formula II or the compound of Formula III and the compound of Formula IV.

TABLE 3

|  | Compound of Formula I, Formula II, or Formula III Compound structure | Compound of Formula I, Formula II, or Formula III Content wt % | Compound of Formula IV Compound structure | Compound of Formula IV Content wt % | Compound of Formula V Compound structure | Compound of Formula V Content wt % | High-temperature interval cycle performance Capacity retention rate | High-temperature storage performance Thickness growth rate | High-temperature storage performance Capacity recovery rate |
|---|---|---|---|---|---|---|---|---|---|
| Example 12 | I-2 | 1 | IV-2 | 3 | — | — | 68.90% | 7.20% | 86.60% |
| Example 34 | I-2 | 1 | IV-2 | 3 | V-2 | 1 | 68.90% | 7.10% | 86.90% |
| Example 35 | I-2 | 1 | IV-2 | 3 | V-2 | 3 | 68.90% | 6.90% | 87.50% |
| Example 36 | I-2 | 1 | IV-2 | 3 | V-2 | 5 | 70.00% | 6.7% | 87.90% |
| Example 37 | I-2 | 1 | IV-2 | 3 | V-2 | 15 | 71.80% | 6.50% | 90.00% |
| Example 38 | I-2 | 1 | IV-2 | 3 | V-2 | 25 | 72.70% | 6.20% | 90.30% |
| Example 39 | I-2 | 1 | IV-2 | 3 | V-2 | 30 | 73.00% | 6.10% | 90.50% |
| Example 5 | I-3 | 1 | IV-1 | 3 | — | — | 61.60% | 9.10% | 83.50% |

TABLE 3-continued

| | Compound of Formula I, Formula II, or Formula III | | Compound of Formula IV | | Compound of Formula V | | High-temperature interval cycle performance | High-temperature storage performance | |
|---|---|---|---|---|---|---|---|---|---|
| | Compound structure | Content wt % | Compound structure | Content wt % | Compound structure | Content wt % | Capacity retention rate | Thickness growth rate | Capacity recovery rate |
| Example 40 | I-3 | 1 | IV-1 | 3 | V-1 | 15 | 65.60% | 8.50% | 84.50% |
| Example 41 | I-3 | 1 | IV-1 | 3 | V-5 | 20 | 66.70% | 8.30% | 84.90% |
| Example 7 | II-1 | 2 | IV-1 | 4 | — | — | 63.70% | 9.00% | 80.90% |
| Example 42 | II-1 | 2 | IV-2 | 4 | V-1 | 5 | 67.00% | 7.60% | 84.20% |
| | | | | | V-2 | 10 | | | |
| Example 43 | II-1 | 2 | IV-2 | 4 | V-1 | 15 | 68.10% | 7.10% | 84.80% |
| | | | | | V-2 | 10 | | | |
| Example 44 | II-1 | 2 | IV-2 | 4 | V-1 | 15 | 68.20% | 6.90% | 85.30% |
| | | | | | V-2 | 15 | | | |
| Comparative Example 1 | — | — | — | — | — | — | 45.20% | 26.10% | 71.30% |
| Comparative Example 4 | — | — | — | — | V-2 | 10 | 57.10% | 23.60% | 73.20% |

The results show that on the basis of at least one of the compounds of Formula I, the compound of Formula II or the compound of Formula III; and the compound of Formula IV, the compound of Formula V can further improve the low capacity retention rate after high-temperature interval cycles, the expansion after high-temperature storage, and the capacity recovery rate after high-temperature storage of the lithium ion battery.

Table 4 shows the influence of the C004/C110 value of the anode active material layer on the high-temperature interval cycle performance of lithium-ion batteries.

TABLE 4

| | Compound of Formula I, Formula II, or Formula III | | Compound of Formula IV | | | High-temperature interval cycle performance | |
|---|---|---|---|---|---|---|---|
| | Compound structure | Content wt % | Compound structure | Content wt % | C004/C110 | Capacity retention rate | Thickness growth rate |
| Example 12 | I-2 | 1 | IV-2 | 3 | 16.3 | 68.90% | 12.30% |
| Example 45 | I-2 | 1 | IV-2 | 3 | 8.2 | 71.6% | 8.90% |
| Example 46 | I-2 | 1 | IV-2 | 3 | 10.4 | 71.30% | 9.40% |
| Example 47 | I-2 | 1 | IV-2 | 3 | 13.8 | 70.70% | 10.50% |
| Example 48 | I-2 | 1 | IV-2 | 3 | 14.1 | 69.90% | 11.70% |
| Example 49 | I-1 | 0.5 | IV-1 | 2 | 10.4 | 70.60% | 10.30% |

The results show that on the basis of Example 12, when the C004/C110 value of the anode active material layer is controlled to fall within the range of 8 to 15, the capacity retention rate and expansion of lithium ion batteries during the high-temperature interval cycle process can be significantly improved.

Tables 5 and 6 show the combined effects of the components in the electrolyte and the anode active material layer.

TABLE 5

| | Compound of Formula I, Formula II, or Formula III | | Compound of Formula IV | | Compound of Formula V | | | | C004/C110 |
|---|---|---|---|---|---|---|---|---|---|
| | Compound structure | Content wt % | Compound structure | Content wt % | Compound structure | Content wt % | Compound structure | Content wt % | |
| Example 12 | I-2 | 1 | IV-2 | 3 | — | — | — | — | 16.3 |
| Example 50 | I-2 | 1 | IV-2 | 3 | V-2 | 15 | LiPO$_2$F$_2$ | 0.3 | 16 |
| Example 51 | I-2 | 1 | IV-2 | 3 | — | — | LiPO$_2$F$_2$ | 0.3 | 8 |
| Example 52 | I-2 | 1 | IV-2 | 3 | V-2 | 15 | — | — | 8 |
| Example 53 | I-2 | 1 | IV-2 | 3 | V-2 | 15 | LiPO$_2$F$_2$ | 0.1 | 8 |
| Example 54 | I-1 | 0.5 | IV-1 | 2 | V-1 | 15 | LiPO$_2$F$_2$ | 0.1 | 8 |

TABLE 6

| | High-temperature interval cycle performance | | High-temperature storage performance | |
|---|---|---|---|---|
| | Capacity retention rate | Thickness growth rate | Thickness growth rate | Capacity recovery rate |
| Example 12 | 68.90% | 12.30% | 7.20% | 86.60% |
| Example 50 | 72.40% | 12.00% | 6.20% | 89.20% |
| Example 51 | 72.10% | 8.60% | 6.70% | 88.50% |
| Example 52 | 72.90% | 8.30% | 6.40% | 89.90% |
| Example 53 | 73.40% | 8.00% | 6.00% | 89.60% |
| Example 54 | 73.10% | 8.2% | 6.30% | 89.70% |

The results show that when the compound of Formula V, i.e. LiPO$_2$F$_2$, is further added to the electrolyte comprising at least one of the compounds of Formula I, the compound of Formula II or the compound of Formula III, and the compound of Formula IV, and the C004/C110 value of the anode active material layer is controlled to fall within the range of 8-15, the low capacity retention rate after high-temperature interval cycles, the expansion after high-temperature interval cycles, and the expansion after high-temperature storage of the lithium ion battery can be particularly significantly improved.

Table 7 shows the influence of the Dv50 and weight ratio of primary particles and secondary particles in the anode active material on the high-temperature interval cycle performance.

TABLE 7

| | Dv50 of primary particles (μm) | Dv50 of secondary particles (μm) | Weight ratio of primary particles/ secondary particles | High-temperature interval cycle performance | |
|---|---|---|---|---|---|
| | | | | Capacity retention rate | Thickness growth rate |
| Example 12 | 2.8 | 21 | 1.2 | 68.90% | 12.30% |
| Example 55 | 4 | 14 | 0.6 | 72.30% | 10.30% |
| Example 56 | 7 | 14 | 0.6 | 71.90% | 11.50% |
| Example 57 | 10 | 14 | 0.6 | 69.20% | 11.90% |
| Example 58 | 7 | 6 | 0.6 | 69.40% | 11.04% |
| Example 59 | 7 | 10 | 0.6 | 72.50% | 10.20% |
| Example 60 | 7 | 20 | 0.6 | 71.70% | 11.30% |
| Example 61 | 7 | 14 | 0.2 | 72.30% | 10.80% |

The results show that when the Dv50 of primary particles in the anode active material layer is in the range of 3 μm to 10 μm, the Dv50 of the secondary particles is in the range of 5 μm to 20 μm and the weight ratio of the primary particles to secondary particles is in the range of 1:9 to 5:5, the lithium-ion batteries have better high-temperature interval cycle performance.

Throughout the specification, references to "embodiment", "part of embodiments", "one embodiment", "another example", "example", "specific example" or "part of examples" mean that at least one embodiment or example of the present application includes specific features, structures, materials or characteristics described in the embodiment or example. Thus, the descriptions appear throughout the specification, such as "in some embodiments," "in an embodiment," "in one embodiment," "in another example," "in an example," "in a particular example" or "for example," are not necessarily the same embodiment or example in the application. Furthermore, the specific features, structures, materials or characteristics in the descriptions can be combined in any suitable manner in one or more embodiments or examples.

Although the illustrative embodiments have been shown and described, it should be understood by those skilled in the art that the above embodiments cannot be interpreted as limitations to the present application, and the embodiments can be changed, substituted and modified without departing from the spirit, principle and scope of the present application.

What is claimed is:

1. An electrolyte, comprising:
a lithium salt;
a solvent; and
additives comprising
a first additive comprising a compound of Formula I-2 and
a second additive comprising a compound of Formula IV-2;
wherein, the compound of Formula I-2 is:

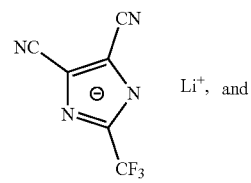

(Formula I-2)

Li$^+$, and the compound of Formula IV-2 is:

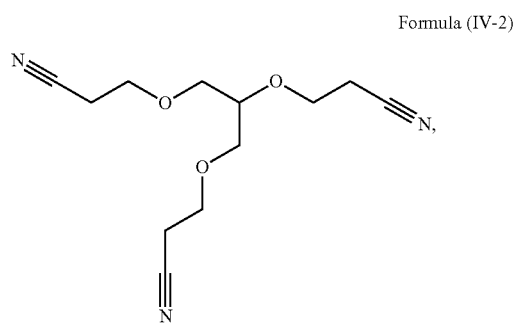 [SMILES: N#CCCOCC(COCCC#N)OCCC#N]

Formula (IV-2)

wherein based on a total weight of the electrolyte, a total content of the compound of Formula I-2 is 0.5 wt % to 10 wt %, and a total content of the compound of Formula IV-2 is 2 wt % to 8 wt %.

2. The electrolyte according to claim 1, further comprising a third additive, wherein, the third additive includes vinylene carbonate, wherein based on the total weight of the electrolyte, a total content of the additive is 1 wt % to 12 wt %.

3. The electrolyte according to any one of claim 1, further comprising a fourth additive comprising a compound of Formula V-2:

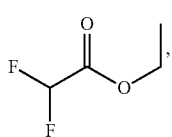
(Formula V-2)

wherein the content of the compound of Formula V-2 is 1 wt % to 30 wt % based on the total weight of the electrolyte.

4. An electrochemical device, comprising:
a cathode, comprising an cathode active material, wherein the cathode active material is lithium cobalt oxide;
an anode, comprising an anode active material, wherein the anode active material is artificial graphite; and
an electrolyte comprising a lithium salt, a solvent, and additives comprising:
  a first additive comprising a compound of Formula I-2 and
  a second additive comprising a compound of Formula IV-2;
wherein, the compound of Formula I-2 is:

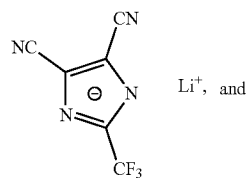
$Li^+$, and
(Formula I-2)

the compound of Formula IV is:

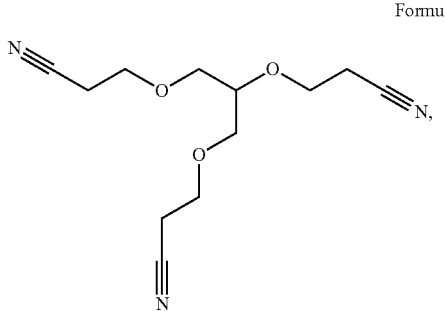
Formula (IV-2)

wherein based on a total weight of the electrolyte, a total content of the compound of Formula I-2 is 0.5 wt % to 10 wt %, and a total content of the compound of Formula IV-2 is 2 wt % to 8 wt %.

5. The electrochemical device according to claim 4, further comprising a third additive, wherein, the third additive includes vinylene carbonate, wherein based on the total weight of the electrolyte, the total content of the additive is 1 wt % to 12 wt %.

6. The electrochemical device according to claim 4, further comprising a fourth additive comprising a compound of Formula V-2:

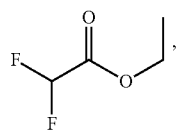
(Formula V-2)

wherein the content of the compound of Formula V-2 is 1 wt % to 30 wt % based on the total weight of the electrolyte.

7. An electronic device, comprising an electrochemical device, wherein the electrochemical device comprises:
a cathode, comprising an cathode active material, wherein the cathode active material is lithium cobalt oxide;
an anode, comprising an anode active material, wherein the anode active material is artificial graphite; and
an electrolyte comprising a lithium salt, a solvent, and additives comprising:
  a first additive comprising a compound of Formula I-2 and
  a second additive comprising a compound of Formula IV-2;
wherein, the compound of Formula I-2 is:

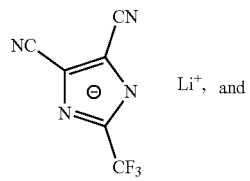
$Li^+$, and
(Formula I-2)

the compound of Formula IV-2 is:

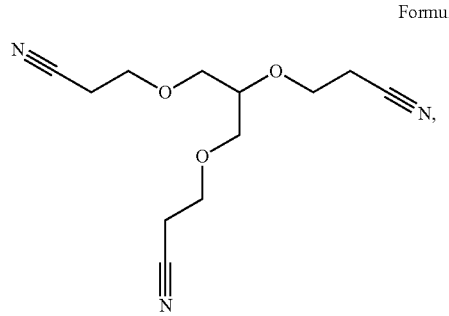
Formula (IV-2)

wherein based on a total weight of the electrolyte, a total content of the compound of Formula I-2 is 0.5 wt % to 10 wt %, and a total content of the compound of Formula IV-2 is 2 wt % to 8 wt %.

* * * * *